(12) United States Patent
Furuta et al.

(10) Patent No.: US 6,306,501 B1
(45) Date of Patent: Oct. 23, 2001

(54) LAMINATED MATERIAL AND PAPER PACK CONTAINER FORMED FROM SAID LAMINATED MATERIAL

(75) Inventors: Motonobu Furuta, Chiba; Takanari Yamaguchi, Ibaraki, both of (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/042,648

(22) Filed: Mar. 17, 1998

(30) Foreign Application Priority Data

Mar. 17, 1997 (JP) .................................................. 9-062909

(51) Int. Cl.⁷ .......................... B32B 25/00; B32B 27/08; B32B 27/10; B32B 27/36; B32B 29/00
(52) U.S. Cl. ...................... 428/411.1; 428/412; 428/421; 428/475.2; 428/479.3; 428/481; 428/483; 525/68; 525/132
(58) Field of Search ................. 525/132, 68; 428/411.1, 428/412, 119, 421, 475.2, 479.3, 481, 483

(56) References Cited

U.S. PATENT DOCUMENTS

| | | | |
|---|---|---|---|
| 5,089,320 | * | 2/1992 | Straus et al. .......................... 428/216 |
| 5,216,073 | * | 6/1993 | Haider et al. .......................... 525/66 |
| 5,364,669 | * | 11/1994 | Sumida et al. ....................... 428/412 |
| 5,817,384 | * | 10/1998 | Furuta et al. ....................... 428/1.54 |

FOREIGN PATENT DOCUMENTS

| | | |
|---|---|---|
| 07 34 851 A2 | 10/1996 | (EP) . |
| 07 37 707 A2 | 10/1996 | (EP) . |
| 07 90 279 A2 | 8/1997 | (EP) . |

OTHER PUBLICATIONS

Functionalized Polyolefins, Products literature from Elf Atochem web site.

* cited by examiner

Primary Examiner—Paul Thibodeau
Assistant Examiner—Ramsey Zacharia
(74) Attorney, Agent, or Firm—Birch, Stewart, Kolasch & Birch, LLP

(57) ABSTRACT

A laminated material comprising at least a paper layer as a substrate and a layer of a liquid-crystal polyester resin composition, which are laid one upon the other, the liquid-crystal polyester resin composition-containing layer comprising (A) liquid-crystal polyester as a continuous phase and (B) rubber having a functional group reactive with the liquid-crystal polyester as a dispersed phase. The laminated material has an excellent heat resistance, flexibility, and gas barrier properties and a paper pack container is formed from said laminated material.

17 Claims, 3 Drawing Sheets

LAMINATED MATERIAL AND PAPER PACK CONTAINER FORMED FROM SAID LAMINATED MATERIAL

BACKGROUND OF THE INVENTION

1. Field of the Invention

The present invention relates to a laminated material comprising a paper layer and a liquid-crystal polyester resin composition layer. More specifically the present invention pertains to a laminated material having excellent heat resistance, flexibility, and gas barrier properties as well as a paper pack container formed from the laminated material.

2. Description of the Related Art

Paper pack container whose one or both surfaces are processed with polyolefin have various advantages, that is, light-weight, unbreakable, inexpensive, and sufficiently hygienic, and are widely used in food, beverage, and other industries. These paper pack containers, however, have insufficient gas barrier properties. Laminated materials of paper and a polyolefin film or an engineering plastic film have been developed to improve the gas barrier properties. Both the polyolefin film and the general-purpose engineering plastic film, however, still have insufficient gas barrier properties with respect to water vapor and oxygen. This often causes oxidation, deterioration, and rot of the contents in the paper pack container of these constituents. Another problem of the conventional paper pack container is insufficient heat resistance.

Several techniques have been proposed to solve such problems. For example, Japanese Patent KOKAI Publication No. 1-199880 discloses a paper pack container including a paper layer and a gas-barrier synthetic resin.

In another example, Japanese Patent KOKAI Publication No. 3-061040 discloses a laminate film including a poly-3-methyl-1-butene layer and a paper layer.

In still another example, Japanese Patent KOKAI Publication No. 3-153348 discloses a sheet laminate including a paper layer and a polymer layer of ethylene-vinyl alcohol copolymer.

In another example, Japanese Patent KOKAI Publication No. 5-154964 discloses a packaging material including a paper layer and a polymer layer of ethylene vinyl acetate copolymer.

None of these proposed Laminates including paper as the substrate, however, have sufficient gas barrier properties or heat resistance.

Another known example is a laminate of paper and a metal foil, such as an aluminum foil, which has excellent gas barrier properties but is not free from a variety of other problems; that is, readily causing pin holes, having poor flexibility, being not applicable to microwave ovens, and having difficulties in waste treatment due to the presence of the metal foil.

SUMMARY OF THE INVENTION

The object of the present invention is thus to provide a laminated material comprising a paper layer as a substrate and a layer of a liquid crystal polyester resin composition, which has an excellent heat resistance, flexibility, and gas barrier properties, as well as a paper pack container formed from such a laminated material.

The inventors have intensively studied to solve the above problems and developed the present invention. The present invention is directed to a laminated material comprising at least a paper layer as a substrate and a layer of a liquid-crystal polyester resin composition, which are laid one upon the other, the liquid-crystal polyester resin composition-containing layer comprising (A) liquid-crystal polyester as a continuous phase and (B) rubber having a functional group reactive with the liquid-crystal polyester as a dispersed phase. The present invention is also directed to a laminated material comprising a paper layer as a substrate, a layer of a liquid-crystal polyester resin composition, and a thermoplastic resin layer, which are laid one upon another, the liquid-crystal polyester resin composition-containing layer comprising (A) liquid-crystal polyester as a continuous phase and (B) rubber having a functional group reactive with the liquid-crystal polyester as a dispersed phase. The present invention is further directed to a paper pack container formed from such a laminated material.

BRIEF DESCRIPTION OF THE DRAWING

The denotations used in the figures are as follows.

1. low-density polyethylene layer
2. liquid-crystal polyester resin composition layer
3. milk carton paper
4. T-die
5. polyethylene film
6. paper layer
7. hot roll
8. roll
9. wind-up roll

DETAILED DESCRIPTION OF THE INVENTION

The present invention will be described in detail.

The paper used as the substrate in the present invention is not specifically limited, but may be kraft paper, milk carton paper, gravure paper, clay-coated paper, general wood free paper, white board, manila board, liner, millboard, or Japanese paper.

The thickness of a paper layer as the substrate in the present invention is not specifically restricted, but may be varied according to the requirements. A paper layer having the thickness of 5 to 1000 $\mu$m is favorably applied.

The component (A) liquid-crystal polyester in the liquid-crystal polyester resin composition of the present invention is a polyester called as "thermotropic liquid-crystal polymer".

Concrete examples are those forming anisotropic melt at temperatures of not higher than 400° C. and include:

(1) a combination of an aromatic dicarboxylic acid, an aromatic diol, and an aromatic hydroxycarboxylic acid;
(2) a combination of different aromatic hydroxycarboxylic acids;
(3) a combination of an aromatic dicarboxylic acid; and
(4) a resultant obtained by making polyester, such as polyethylene terephthalate with an aromatic hydroxycarboxylic acid.

The aromatic dicarboxylic acid, the aromatic diol, and the aromatic hydroxycarboxylic acid may be replaced by their ester forming derivatives.

The repeating unit of the liquid-crystal polyester may be (1) a repeating unit derived from an aromatic dicarboxylic acid, (2) a repeating unit derived from an aromatic diol, and (3) a repeating unit derived from an aromatic hydroxycarboxylic acid given below, although not being restricted to these structures.

(1) Repeating unit derived from an aromatic dicarboxylic acid (2) Repeating unit derived from an aromatic diol (3) Repeating unit derived from an aromatic hydroxycarboxylic acid The favorable liquid-crystal polyester based on the well balance of the heat resistance, the mechanical properties, and the workability preferably includes at least 30% by mole of a repeating unit defined as:

and concretely has a combination of repeating units selected out of the group consisting of (I) through (VI) given below:

(I)

(II)

(III)

(IV)

(V)

(VI)

Manufacture of these liquid-crystal polyesters (I) through (VI) are specified in, for example, Japanese Patent KOKOKU Publication Nos. 47-47870, 63-3888, 63-3891, and 56-18016, and Japanese Patent KOKAI Publication No. 2-051523. Preferable combinations are (I), (II), and (IV), and the combinations (I) and (II) are more preferable.

In case that the high heat resistance is required for the liquid-crystal polyester resin composition of the present invention, it is preferable that the constituent (A) liquid-crystal polyester includes 30 to 80% by mole of a repeating unit (a'), 0 to 10% by mole of a repeating unit (b'), 10 to 25% by mole of a repeating unit (c'), and 10 to 35% by mole of a repeating unit (d') given below:

(a')

(b')

(c')

(d')

where Ar denotes a divalent aromatic group.

The constituent (B) of the liquid-crystal polyester resin composition of the present invention is rubber having a functional group reactive with the liquid-crystal polyester.

The rubber here corresponds to the polymer substance having rubber elasticity at room temperature as defined in Shinpan Kobunshi Jiten (New Edition of Polymer Dictionary) (compiled by Polymer Society, 1998, Asakura Shoten). Concrete examples of the rubber include natural rubber, butadiene polymers, butadiene-styrene copolymers (including random copolymers, block copolymers (including SEBS rubber or SBS rubber), and graft copolymers) and their hydrogenated rubber, isoprene polymer, chlorobutadiene polymer, butadiene-acrylonitrile copolymer, isobutylene polymer, isobutylene-butadiene copolymer rubber, isobutylene-isoprene copolymer, acrylate-ethylene copolymer rubber, ethylene-propylene copolymer rubber, ethylene-butene copolymer rubber, ethylene-propylene-styrene terpolymer rubber, styrene-isoprene copolymer rubber, styrene-butylene-copolymers, styrene-ethylene-propylene terpolymer rubber, perfluororubber, fluororubber, chloroprene rubber, butyl rubber, silicon rubber, ethylene-propylene-non-conjugated diene terpolymer rubber, thiol rubber, polysulfide rubber, polyurethane rubber, polyether rubber (such as polypropylene oxide), epichlorohydrin rubber, polyester elastomer, and polyamide elastomer. Preferable examples are acrylic rubber, butadiene-styrene copolymer and their hydrogenated rubber, and acrylate-ethylene copolymer, and especially preferable are (meth)acrylate-ethylene copolymer rubber.

These rubber substances may be manufactured in the presence of any catalyst (for example, peroxides, trialkyl aluminums, lithium halides, and nickel catalysts) according to any manufacturing process (for example, emulsion polymerization and solution polymerization).

The rubber (B) of the present invention is one of the above rubbers having a functional group reactive with the liquid-crystal polyester.

The functional group reactive with the liquid-crystal polyester may be an oxazolyl group, an epoxy group, or an amino group, but an epoxy group is preferable. The epoxy group may exist as part of another functional group, such as a glycidyl group.

The method of introducing the functional group reactive with the liquid-crystal polyester into the rubber (B) of the present invention is not specifically restricted, but any known process is applicable. For example, a monomer having a functional group reactive with the liquid-crystal polyester may be introduced into the rubber by copolymerization in the course of synthesizing the rubber. In another example, the monomer having a functional group reactive with the liquid-crystal polyester may be graft copolymerized with the rubber.

Preferable examples of the monomer having a functional group reactive with the liquid-crystal polyester, especially the monomer with a glycidyl group, include unsaturated glycidyl carboxylates and unsaturated glycidyl ethers. The rubber (B) of the present invention having a functional group reactive with the liquid-crystal polyester is preferably copolymer rubber containing an unsaturated glycidyl carboxylate unit and/or an unsaturated glycidyl ether unit.

The unsaturated glycidyl carboxylate is expressed as a general formula given below:

where R denotes a hydrocarbon radical of 2 to 13 carbon atoms having ethylene unsaturated bonding.

The unsaturated glycidyl ether is expressed as a general formula given below:

where R denotes a hydrocarbon radical of 2 to 18 carbon atoms having ethylene unsaturated bonding, and X denotes $CH_2-O-$ or Concrete examples of the unsaturated glycidyl carboxylate include glycidyl acrylate, glycidyl methacrylate, diglycidyl itaconate, triglycidyl butene tricarboxylate, and glycidyl p-styrene carboxylate.

Concrete examples of the unsaturated glycidyl ether include vinyl glycidyl ether, allyl glycidyl ether, 2-methylallyl glycidyl ether, methacryl glycidyl ether, and styrene-p-glycidyl ether.

A preferable example of the rubber (B) having a functional group reactive with the liquid-crystal polyester is (meth)acrylate-ethylene-(unsaturated glycidyl carboxylate and/or unsaturated glycidyl ether) terpolymer rubber.

The (meth)acrylate is an ester obtained from acrylic acid or methacrylic acid and an alcohol. It is preferable that the alcohol is one of those containing one to eight carbon atoms. Concrete examples of the (meth)acrylate include methyl acrylate, methyl methacrylate, n-butyl acrylate, n-butyl methacrylate, tert-butyl acrylate, tert-butyl methacrylate, 2-ethylhexyl acrylate, and 2-ethylhexyl methacrylate. One or a combination of these examples may be used as the (meth)acrylate.

The (meth)acrylate-ethylene-(unsaturated glycidyl carboxylate and/or unsaturated glycidyl ether) terpolymer rubber is manufactured by a known process, for example, bulk polymerization with a free-radical initiator, emulsion polymerization, or solution polymerization. A typical polymerization method manufactures the terpolymer rubber in the presence of a polymerization initiator for producing free radicals under the pressure of not less than 500 kg/cm² at temperatures of 400 to 300° C. as specified in Japanese Patent KOKOKU Publication No. 46-45085 and Japanese Patent KOKAI Publication No. 61-127709.

The rubber (B) of the present invention having a functional group reactive with the liquid-crystal polyester includes the (meth)acrylate unit of more than 40% by weight and less than 97% by weight or preferably in the range of 45 to 70% by weight, the ethylene unit of not less than 3% by weight and less than 50% by weight or preferably in the range of 10 to 49% by weight, and the unsaturated glycidyl carboxylate and/or unsaturated glycidyl ether unit of 0.1 to 30% by weight or preferably in the range of 0.5 to 20% by weight.

The (meth)acrylate unit of not more than 40% by weight lowers the rubber elasticity and may reduce the effect of improving the shock resistance of the composition. The (meth)acrylate unit of not less than 97% by weight, on the other hand, increases the embrittlement point of the terpolymer rubber and may deteriorate the mechanical properties of the composition at low temperatures.

The unsaturated glycidyl carboxylate and/or unsaturated glycidyl ether unit of less than 0.1% by weight lowers the shock resistance of the liquid-crystal polyester resin composition. The unsaturated glycidyl carboxylate and/or unsaturated glycidyl ether unit of more than 30% by weight, on the other hand, may lower the stiffness of the composition.

The rubber (B) of the present invention has the Mooney viscosity of preferably 3 to 70, more preferably 3 to 30, and most preferably 4 to 25.

The Mooney viscosity is measured at 100° C. with a large rotor according to JIS K6300.

The quantity of crystal-fusing heat of the rubber (B) is preferably less than 6 J/g, more preferably less than 3 J/g. The crystal-fusing heat of not less than 6 J/g may lower the heat stability of the composition.

The quantity of crystal-fusing heat is measured using DSC with heating the rubber from −15 ° C. to 100° C. at the rate of 20° C./minute.

The rubber (B) of the present invention may be vulcanized according to the requirements to vulcanized rubber.

The (meth)acrylate-ethylene-(unsaturated glycidyl carboxylate and/or unsaturated glycidyl ether) terpolymer rubber is vulcanized with a polyfunctional organic acid, a polyfunctional amine, or an imidazole compound, although these examples are not restrictive in any sense.

The liquid-crystal polyester resin composition of the present invention includes the liquid-crystal polyester (A) as a continuous phase and the rubber (B) as a dispersed phase.

In case that the liquid-crystal polyester is not the continuous phase, the layer of the liquid-crystal polyester resin composition has extremely lowered gas barrier properties and heat resistance.

The liquid-crystal polyester resin composition of the present invention contains the constituents (A) and (B) at the following proportions: the constituent (A) of preferably 56.0 to 99.9% by weight, more preferably 65.0 to 99.9% by weight, and most preferably 70 to 98% by weight and the constituent (B) of preferably 44.0 to 0.1% by weight, more preferably 35.0 to 0.1% by weight, and most preferably 30 to 2% by weight.

The constituent (A) of less than 56.0% by weight may lower the gas barrier properties. The constituent (A) of more than 99.9% by weight, on the other hand, may cause insufficient improvement of the film-forming properties of the composition and increase the manufacturing cost.

Any known method is applicable to manufacture the liquid-crystal polyester resin composition of the present invention. One applicable method mixes the respective constituents in the state of a solution and evaporates the solvent or precipitates the composition in the solvent. From the industrial point of view, a preferable method is to knead the respective constituents in a molten state. Kneading devices, such as a single-screw extruder, a twin-screw extruder and various kneaders, may be used for melting and kneading. Especially preferable is a twin-screw extruder.

The temperature of the cylinder in the kneading device in the process of melting and kneading is set preferably in the range of 200 to 360° C. and more preferably in the range of 230 to 350° C.

The respective constituents may be mixed with a mixing machine, such as a tumbling mixer or a Henschel mixer, in advance to the kneading process. Alternatively predetermined quantities of the respective constituents may be fed separately to the kneading device.

An inorganic filler may be added to the liquid-crystal polyester resin composition of the present invention according to the requirements. Examples of the inorganic filler include calcium carbonate, talc, clay, silica, magnesium carbonate, barium sulfate, titanium oxide, alumina, plaster, glass flakes, glass fibers, carbon fibers, alumina fibers, silica alumina fibers, aluminum borate whiskers, and potassium titanate fibers.

Other additives may further be added to the liquid-crystal polyester resin composition of the present invention in the manufacturing process or in the subsequent working process according to the requirements. Examples of the additives include an organic filler, an antioxidant, a heat stabilizer, a light stabilizer, a flame-retardant, a lubricant, an antistat, inorganic and organic colorants, an anti-corrosive agent, a crosslinking agent, a foaming agent, a fluorescent agent, a surface smoothing agent, a surface gloss improvement agent, and a mold parting improvement agent, such as fluororesin.

The thickness of the liquid-crystal polyester resin composition layer of the present invention is not specifically restricted, but is preferably 3 to 500 μm and more preferably 3 to 200 μm.

The laminated material of the present invention may further include a thermoplastic resin layer. It is preferable that the thermoplastic resin includes at least one selected from the group consisting of polyolefins, polystyrene, polycarbonates, polyesters (except liquid crystal polyesters), polyacetals, polyamides, polyphenylene ether, polyether sulfone, ethylene-vinyl acetate copolymer, polyvinyl chloride, polyvinylidene chloride, polyphenylene sulfide, and fluororesin.

Especially preferable are those including at least one of polyolefins, polyesters, and polyamides.

The polyolefins may be single polymers and copolymers of olefins and diolefins containing 2 to 20 carbon atoms. Concrete examples of the olefins and diolefins include ethylene, propylene, 1-butene, 1-pentene, 1-hexene, 1-heptene, 1-octene, 1-nonene, 1-decene, 1-hexadecene, and 1,4-eicosene-1,5-methylpentene-2-methyl-1-pentene. Concrete examples of the polyolefins include low-density polyethylene, high-density polyethylene, polypropylene, poly(1-butene), poly(4-methyl-1-pentene), ethylene/1-butene copolymer, ethylene/4-methyl-1-pentene copolymer, ethylene/1-hexene copolymer, propylene/ethylene copolymer, and propylene/1-butene copolymer.

The polyester here may be a polycondensate of a divalent carboxylic acid and a divalent alcohol and is preferably a polycondensate of an aromatic dicarboxylic acid and an alkylene glycol. Concrete examples of the polyester include polyethylene terephthalate and polybutylene terephthalate.

The polyamide here may be a polycondensate of a divalent carboxylic acid and a divalent amine or a polycondensate of an aminocarboxylic acid. Concrete examples of the polyamide include polyamide 6, polyamide 12, polyamide 11, polyamide 6-6, polyamide 6-1, and polyamide MXD6.

In case that the laminated material of the present invention is used for a paper pack container, polyolefins are preferable among these thermoplastic resins. Among the polyolefins, polyethylene or more specifically low-density polyethylene is preferable. The thickness of the thermoplastic resin layer is not specifically restricted, but is preferably in the range of 5 to 100 μm. The thermoplastic resin layer may be bonded to the paper substrate layer or the liquid-crystal polyester resin layer by a known method, such as heat pressing.

The liquid-crystal polyester resin composition layer and the thermoplastic resin layer of the present invention may be subjected to the surface treatment. The applicable processes for the surface treatment include corona discharge treatment, plasma treatment, flame treatment, sputtering treatment, and solvent treatment.

The laminated material of the present invention includes at least a paper substrate layer (I) and a liquid-crystal polyester resin composition layer (II). The laminated material may be a two-layer laminated material of the layer (I) and the layer (II), a three or more-layer laminated material of the layers (I) and (II) alternately, a three-layer laminated material of the layer (II), the layer (I), and a thermoplastic resin layer, such as a polyethylene layer, or a four or more-layer laminate of the layers (I) and (II) and the thermoplastic resin layer alternately.

Another possible laminated material has the structure of thermoplastic resin layer/layer (I)/layer (II)/thermoplastic resin layer. The laminated material may have the structure of more layers.

An adhesive layer may be interposed between the respective layers.

The adhesive layer may be a hot melt adhesive layer, a polyurethane adhesive layer, or an adhesive film layer.

The method of manufacturing the laminated material of the present invention is not specifically restricted. One applicable method bonds a paper layer to a liquid-crystal polyester resin composition film obtained by the inflation film-forming method or the T-die extrusion method or bonds a paper layer to a thermoplastic resin film with a heated roll or by hot pressing with a pressing machine. Another applicable method coats a paper layer with molten liquid-crystal polyester resin composition. Still another applicable method lays a paper layer upon a laminate obtained by co-extruding a liquid-crystal polyester resin and a thermoplastic resin.

The laminated material of the present invention is applied to a paper pack container.

Neither the shape of the paper pack container nor its manufacturing process is specifically restricted. The shape of a paper pack container may be, for example, rectangular, parallelepiped, cube, cylinder, or gable top. For example, the laminated material is punched out to a desired shape, which is formed to a paper pack container by thermal welding or ultrasonic welding.

The laminated material of the present invention does not produce any halogen-containing gas nor leave ash in disposal or combustion. The laminated material is applicable for microwave ovens.

The laminate structure of the paper pack container preferably has a thermoplastic resin layer, such as a low-density polyethylene layer, as the inner-most layer that is in direct contact with the contents.

The contents may be milk, milk products, coffee, oolong tea, black tea, green tea, sports drink, soup, thick soup, mineral water, juice, alcohols, cosmetics, perfume, and chemicals.

Figure 1:
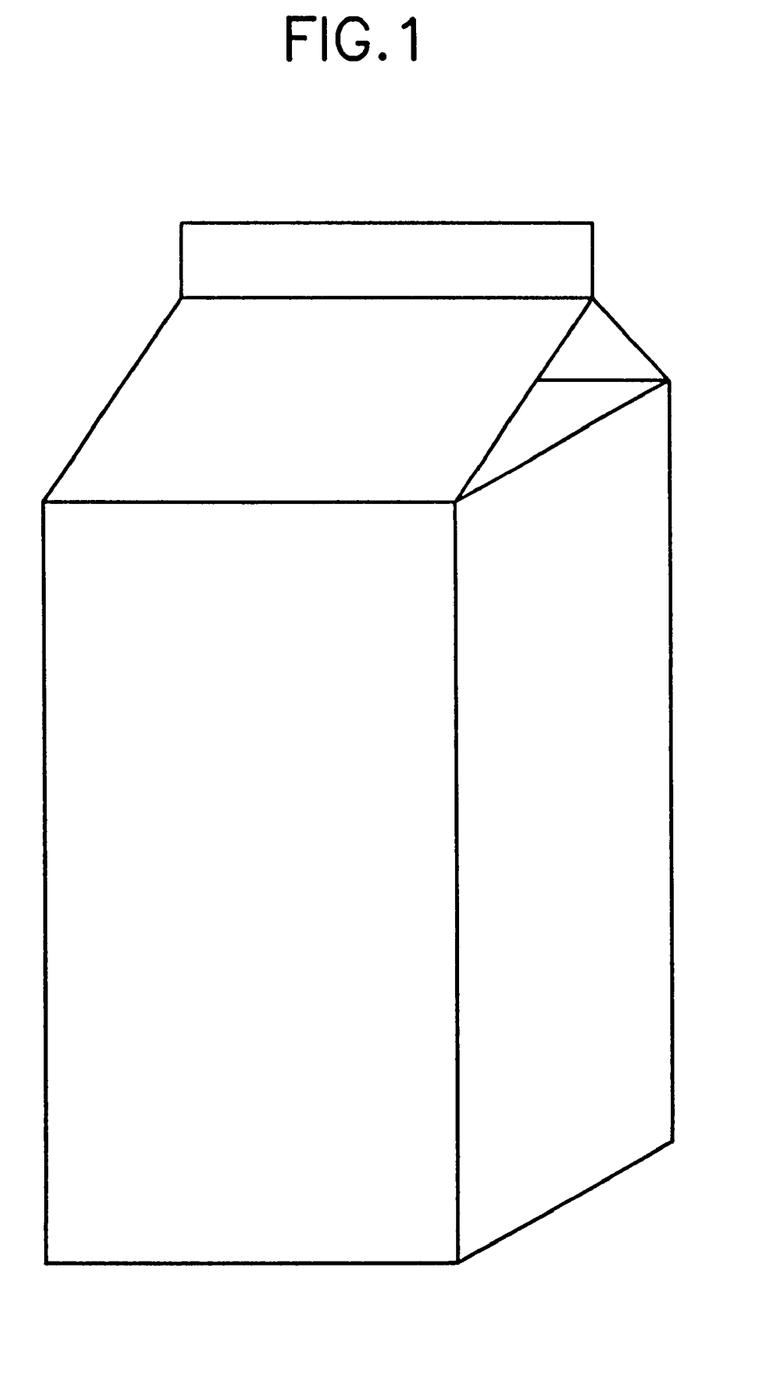
FIG. 1 illustrates a paper pack container formed from the laminated material of the present invention.
Figure 2:
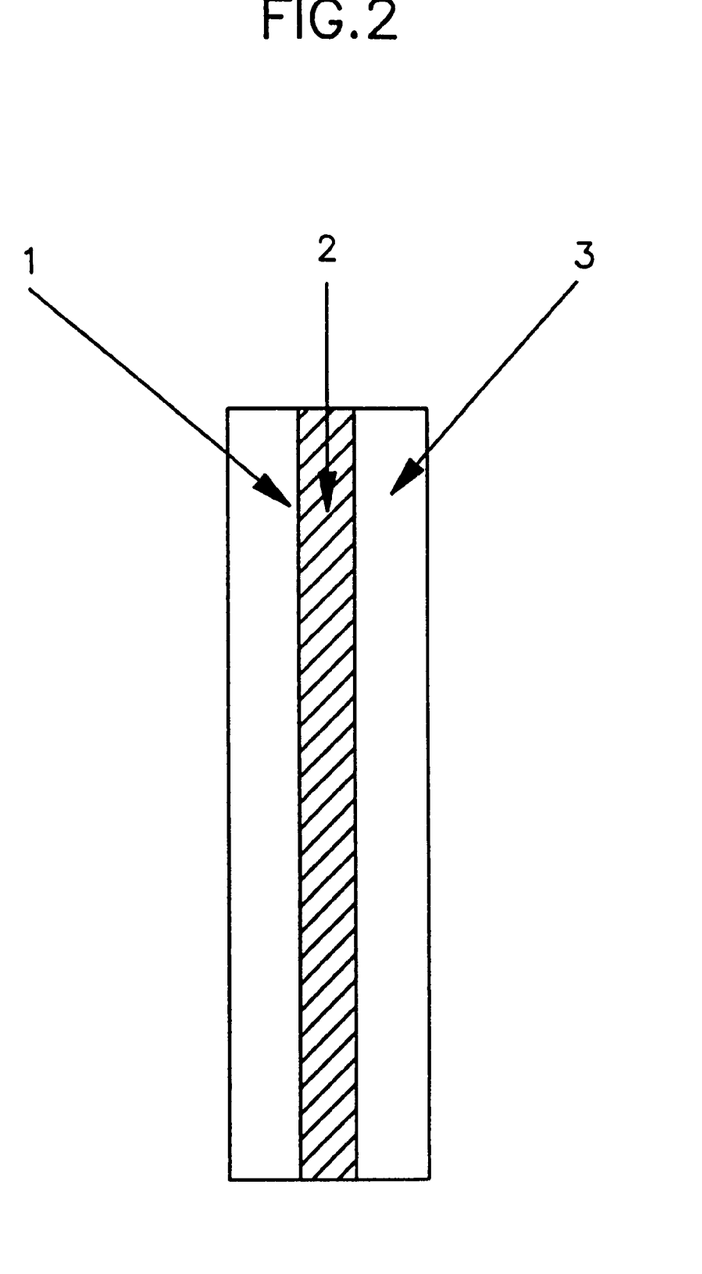
FIG. 2 is a cross sectional view showing the laminated material of the paper pack container of FIG. 1.

FIG. 1 illustrates a paper pack container formed from the laminated material of the present invention.

The paper pack container includes an inner-most layer of low-density polyethylene that is in direct contact with the contents, such as juice, an intermediate layer of liquid-crystal polyester resin composition, and an outer-most paper layer.

PREFERRED EMBODIMENTS OF THE INVENTION

The present invention is described with the examples, although these examples are only illustrative and not restrictive in any sense.

(1) Constituent (A) Liquid-Crystal Polyester (i) A mixture including 8.3 kg (60 mole) of p-acetoxybenzoic acid, 2.49 kg (15 mole) of terephthalic acid, 0.83 kg (5 mole) of isophthalic acid, and 5.45 kg (20.2 mole) of 4,4'-diacetoxydiphenyl was loaded in a polymerizer with comb-shaped agitating blades, heated in a nitrogen atmosphere with stirring, and polymerized at 330° C. for one hour. While the gaseous acetic acid evolved as a by-product was liquefied through a cooling tube for recovery and removal, the mixture was polymerized with vigorous stirring. The system was gradually cooled down and the resulting polymer was taken out of the system at 200° C. The resulting polymer was grounded with a hammer mill manufactured by Hosokawa Micron Co., Ltd. to particles of not larger than 2.5 mm in size. The polymer particles were treated in a nitrogen atmosphere at 280° C. for three hours in a rotary kiln, so as to yield overall aromatic polyester particles having a flow temperature of 324° C. and repeating units defined below.

The flow temperature here was measured at the melting viscosity of 48,000 poise with a flow tester CFT-500 manufactured by Shimadzu Corp. by extruding a resin heated at the rate of 4° C./minute from a nozzle of 1 mm in inner diameter and 10 mm in length under the load of 100 kgf/cm².

The liquid-crystal polyester thus obtained is hereinafter referred to as A-1. This polymer showed the optical anisotropy at temperatures of not lower than 340° C. under pressure. The ratio of the repeating units of the liquid-crystal polyester A-1 is defined as:

(ii) A mixture including 16.6 kg (12.1 mole) of p-hydroxybenzoic acid, 8.4 kg (4.5 mole) of 6-hydroxy-2-naphthoic acid, and 18.6 kg (18.2 mole) of acetic anhydride was loaded in a polymerizer with comb-shaped agitating blades, heated in a nitrogen atmosphere with stirring, and polymerized at 320° C. for one hour and under reduced pressure of 2.0 torr at 320° C. for another one hour. Acetic acid produced as a by-product was continuously run out of the system. The system was gradually cooled down and the resulting polymer was taken out of the system at 180° C.

Like (A-1), the resulting polymer was grounded and treated in a nitrogen atmosphere at 240° C. for five hours in a rotary kiln, so as to yield overall aromatic polyester particles having a flow temperature of 270° C. and repeating units defined below.

The liquid-crystal polyester thus obtained is hereinafter referred to as A-2. This polymer showed the optical anisotropy at temperatures of not lower than 280° C. under pressure. The ratio of the repeating units of the liquid-crystal polyester A-2 is defined as:

= 73:27

(2) Constituent (B) Rubber

The Mooney viscosity was measured at 100° C. with a large rotor according to JIS K6300.

The quantity of crystal-fusing heat was measured by DSC by increasing the temperature from −150° C. to 100° C. at the rate of 20° C./minute.

(i) Rubber was prepared according to the method specified in Example 5 of Japanese Patent KOKAI Publication No. S-61-127709. The rubber included methyl acrylate/ethylene/glycidyl methacrylate=59.0/38.7/2.3 (ratio by weight) and had the Mooney viscosity=15 and the quantity of crystal-fusing heat <1 J/g. This rubber hereinafter may be referred to as B-1.

(ii) Rubber was prepared according to the method specified in Example 5 of Japanese Patent KOKAI Publication No. S-61-127709. The rubber included methyl acrylate/ethylene/glycidyl methacrylate=56.0/40.7/3.3 (ratio by weight) and had the Mooney viscosity=12 and the quantity of crystal-fusing heat <1 J/g. This rubber hereinafter may be referred to as B-2.

(3) Measurement of Gas Permeability

The gas permeability of the resulting laminated material was measured in the following manner.

Oxygen gas permeability: measured with an oxygen gas at the temperature of 20° C. according to JIS K7126 (differential pressure method). The unit is $cc/m^2(24$ hr(1 atm.

Water vapor permeability: measured at the temperature of 40° C. and the relative humidity of 90% according to JIS Z0208 (cup method). The unit is $g/m^2(24$ hr(1 atm.

REFERENCE 1

A composition was obtained by mixing 77 parts by weight of A-1 and 23 parts by weight of B-1 with a Henschel mixer and kneading the mixture at the cylinder temperature of 349° C. and the screw speed of 170 rpm with a twin screw extruder TEX-30 manufactured by Nihon Seiko Co., Ltd.

Pellets of the composition were fed to a single-screw extruder of 50 mm φ with a cylindrical die and kneaded at the cylinder temperature of 351° C. and the rotating speed of 60 rpm. The molten resin was extruded upward from the cylindrical die having the diameter of 50 mm and the die gap of 1.0 mm at 348° C. to form a tubular film. The dried air was injected into the hollow portion of the tubular film for expansion. After cooling, the expanded tubular film was wound up through nip rolls at the winding-up speed of 15 m/min to yield a liquid-crystal polyester resin composition film.

The film had the draw ratio of 3.1 in the MD direction, the blow ratio of 3.7, and the film thickness of 39 µm. This film hereinafter may be referred to as g-1.

REFERENCE 2

The film-forming process was carried out in the same manner as Reference 1 with only the liquid-crystal polyester A-1 instead of the composition of Reference 1, but no film was obtained.

REFERENCE 3

A composition was obtained in the same manner as Reference 1, except that the mixture included 91 parts by weight of A-2 and 9 parts by weight of B-2 and the cylinder temperature was set to 298° C. A film was then obtained in the same manner as Reference 1 except the following conditions: the cylinder temperature of 290° C., the die temperature of 293° C., and the draw-off speed of 25 m/min.

The film had the draw ratio of 5.5 in the MD direction, the blow ratio of 4.1, and the film thickness of 31 µm. This film hereinafter may be referred to as g-2.

REFERENCE 4

The film-forming process was carried out in the same manner as Reference 3 except that the mixture included 91 parts by weight of A-2 and 9 parts by weight of low-density polyethylene L405 manufactured by Sumitomo Chemical Co., Ltd. (MFR. =3.7 g/10 min), but no film was obtained.

EXAMPLE 1

A two-component type curing polyurethane adhesive AD-315 manufactured by Toyo Morton Co., Ltd. was applied and dried on the liquid-crystal polyester resin composition film g-1 obtained in Reference 1. White board of 75 $g/m^2$ in weight and 120 micrometer in thickness was bonded to the surface of the film with the adhesive applied thereon and thermally pressed with a laminator manufactured by Toyo Seiki Co., Ltd. This gave a laminate film.

EXAMPLE 2

The liquid-crystal polyester resin composition film g-2 and a low-density polyethylene film S-1 of 35 µm in thickness manufactured by Kaito Chemical Co., Ltd. were successively laid upon milk carton paper having the weight of 120 $g/m^2$, and integrated under pressure to a three-layer laminate. The results of the gas barrier test of the resulting laminate are shown in Table 1.

COMPARATIVE EXAMPLE 1

A laminate film was obtained in the same manner as Example 2, except that the liquid-crystal polyester resin composition film g-2 was not used, and subjected to the gas barrier test. The results are also shown in Table 1.

EXAMPLE 3

Figure 3:
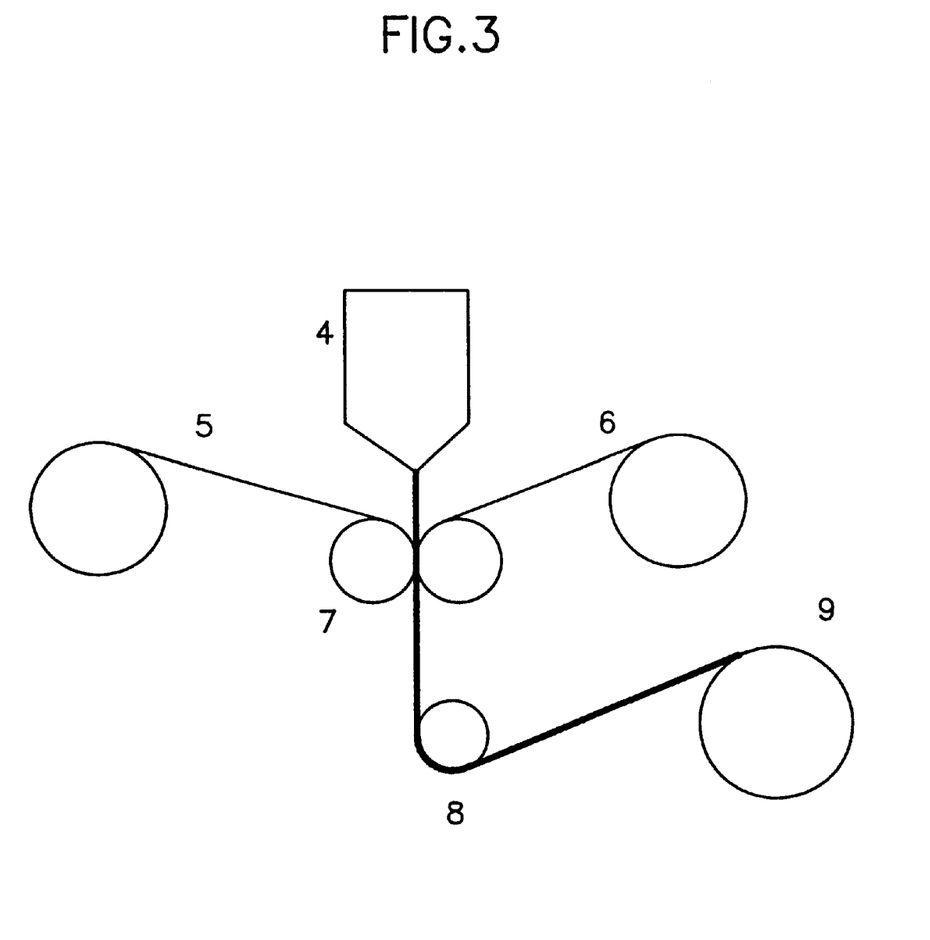
FIG. 3 schematically illustrates a device used in Example 3.

FIG. 3 schematically illustrates a device used herein. Linear low-density polyethylene LL-2 of 30 µm in thickness manufactured by Kaito Chemical Co., Ltd. was fed from a roll at the speed of 3 m/min, whereas wood free paper having the weight of 60 $g/m^2$ and the thickness of 75 µm was fed from a roll at the speed of 3 m/min. The pellets obtained in Reference 1 by kneading the composition of 77% by weight of A-1 and 23% by weight of B-1 were extruded from a T-die (4) of a single-screw extruder of 50 mm φ between the linear low-density polyethylene LL-2 (5) and the wood free paper (6). The conditions of extrusion were as follows: the cylinder temperature of 350° C., the screw speed of 80 rpm, the die lip width of 300 mm, the die slit gap of 0.8 mm, and the die temperature of 352° C. They were pressed using hot roll (7) heated to the temperature of 190° C. and wound up on a wind-up roll (9) at the speed of 3 m/min to yield a three-layer laminate. The liquid-crystal polyester resin composition layer in the laminate had the thickness of 47 µm. The gas barrier performance of the laminate is shown in Table 1.

COMPARATIVE EXAMPLE 2

The film forming process was carried out in the same manner as Example 3, except that only A-1 was used instead of the composition of 77% by weight of A-1 and 23% by weight of B-1. The resulting A-1 layer had significant unevenness of the thickness, and no desirable laminate was obtained.

TABLE 1

| | Structure of laminate | Water vapor permeability (g/m² · 24 hr · atm) | Oxygen gas permeability (cc/m² · 24 hr · 0 atm) |
|---|---|---|---|
| Example 1 | g-1/ adhesive layer/ white board | 0.2 | 0.3 |
| Example 2 | low-density polyethylene/ g-2/ milk carton paper | 0.3 | 0.3 |
| Comparative example 1 | low-density polyethylene/ milk carton paper | 39 | >1000 |
| Example 3 | linear low-density polyethylene/ liquid-crystal polyester resin composition/ wood free paper | 0.2 | 0.2 |
| Comparative example 2 | linear low-density polyethylene/ A-1/ wood free paper | — | |

The laminated material of the present invention has excellent gas barrier properties and is relatively cheap and good processability. The laminated material is environment conscious, since combustion of the laminated material does not leave ash nor produce any halogen-containing gas. The laminated material is applicable for microwave ovens and can widely be used for packs of food, milk, milk product, juice, alcohols, chemicals, cosmetics, and electronic materials.

What is claimed is:

1. A laminated material comprising at least a paper layer as a substrate and a layer of a liquid-crystal polyester resin composition, which are laid one upon the other, said liquid-crystal polyester resin composition comprising (A) 70 to 98% by weight of a liquid-crystal polyester as a continuous phase and (B) 30 to 2% by weight of a rubber having a functional group reactive with the liquid-crystal polyester as a dispersed phase.

2. A laminated material comprising a paper layer as a substrate, a layer of a liquid-crystal polyester resin composition, and a thermoplastic resin layer, which are laid one upon another, said liquid-crystal polyester resin composition comprising (A) 70 to 98% by weight of a liquid-crystal polyester as a continuous phase and (B) 30 to 2% by weight of a rubber having a functional group reactive with the liquid-crystal polyester as a dispersed phase.

3. A laminated material according to claim 2, wherein said thermoplastic resin comprises at least one member selected from the group consisting of polyolefins, polystyrene, polycarbonates, polyesters, polyacetals, polyamides, polyphenylene ether, polyether sulfone, ethylene-vinyl acetate copolymer, polyvinyl chloride, polyvinylidene chloride, polyphenylene sulfide, and fluororesins.

4. A laminated material according to any one of claims 1 to 3, wherein said liquid-crystal polyester resin composition is provided by melting and kneading the liquid-crystal polyester (A) and the rubber (B) having a functional group reactive with the liquid-crystal polyester.

5. A laminated material according to any one of claims 1 to 3, wherein the functional group reactive with the liquid-crystal polyester is any one of an oxazolyl group, an epoxy group, and an amino group.

6. A laminated material according to any one of claims 1 to 3, wherein the functional group reactive with the liquid-crystal polyester is an epoxy group.

7. A laminated material according to any one of claims 1 to 3, wherein the rubber (B) having the functional group reactive with the liquid-crystal polyester comprises a copolymer rubber containing an unsaturated glycidyl carboxylate unit and/or an unsaturated glycidyl ether unit.

8. A laminated material according to any one of claims 1 to 3, wherein the rubber (B) having the functional group reactive with the liquid-crystal polyester comprises a (meth)acrylate-ethylene-(unsaturated glycidyl carboxylate and/or unsaturated glycidyl ether) copolymer rubber.

9. A laminated material according to claim 8, wherein the (meth)acrylate comprises at least one member selected from the group consisting of methyl acrylate, methyl methacrylate, n-butyl acrylate, n-butyl methacrylate, tert-butyl acrylate, tert-butyl methacrylate, 2-ethylhexyl acrylate, and 2-ethylhexyl methacrylate.

10. A laminated material according to any one of claims 1 to 3, wherein the rubber (B) having the functional group reactive with the liquid-crystal polyester comprises a copolymer rubber containing a (meth)acrylate unit of more than 40% by weight and less than 97% by weight, an ethylene unit of not less than 3% by weight and less than 50% by weight, and an unsaturated glycidyl carboxylate unit and/or an unsaturated glycidyl ether unit of 0.1 to 30% by weight.

11. A laminated material according to any one of claims 1 to 3, wherein the rubber (B) having the functional group reactive with the liquid-crystal polyester comprises a copolymer whose quantity of crystal-fusing heat is less than 6 J/g.

12. A laminated material according to any one of claims 1 to 3, wherein the rubber (B) having the functional group reactive with the liquid-crystal polyester has a Mooney viscosity in a range of 3 to 70, where the Mooney viscosity is measured at 100° C. with a large rotor according to JIS K6300.

13. A laminated material according to any one of claims 1 to 3, wherein the rubber (B) having the functional group reactive with the liquid-crystal polyester has a Mooney viscosity in a range of 3 to 30, where the Mooney viscosity is measured at 100° C. with a large rotor according to JIS K6300.

14. A laminated material according to any one of claims 1 to 3, wherein the liquid-crystal polyester (A) is obtained by reacting an aromatic dicarboxylic acid with an aromatic diol and an aromatic hydroxycarboxylic acid.

15. A laminated material according to any one of claims 1 to 3, wherein the liquid-crystal polyester (A) is obtained by reaction among different aromatic hydroxycarboxylic acids.

16. A paper pack container comprising a laminated material according to any one of claims 1 to 3.

17. A laminated material according to any one of claims 1 through 3, wherein the liquid-crystal polyester (A) comprises a repeating unit as defined below of at least 30% by mole

* * * * *